United States Patent Office 3,210,341
Patented Oct. 5, 1965

3,210,341
9,11-EPOXY-6-FLUORO-Δ[4,16]-PREGNADIENES AND PRODUCTS PRODUCED THEREFROM
Frank H. Lincoln, Portage Township, Kalamazoo County, and William P. Schneider, Kalamazoo, Mich., assignors to The Upjohn Company, Kalamazoo, Mich., a corporation of Delaware
No Drawing. Filed Mar. 29, 1963, Ser. No. 269,169
11 Claims. (Cl. 260—239.55)

This invention relates to novel processes for the production of 6α,9α-difluoro-11β,16α,17α,21-tetrahydroxy-1, 4-pregnadiene-3,20-dione, the 16α,21-diacylates thereof, the corresponding 1-saturated derivatives and the novel intermediates obtained in the preparation of all of the foregoing compounds.

The novel compounds of this invention and processes for the preparation thereof are illustratively represented by the following sequence of formulae:

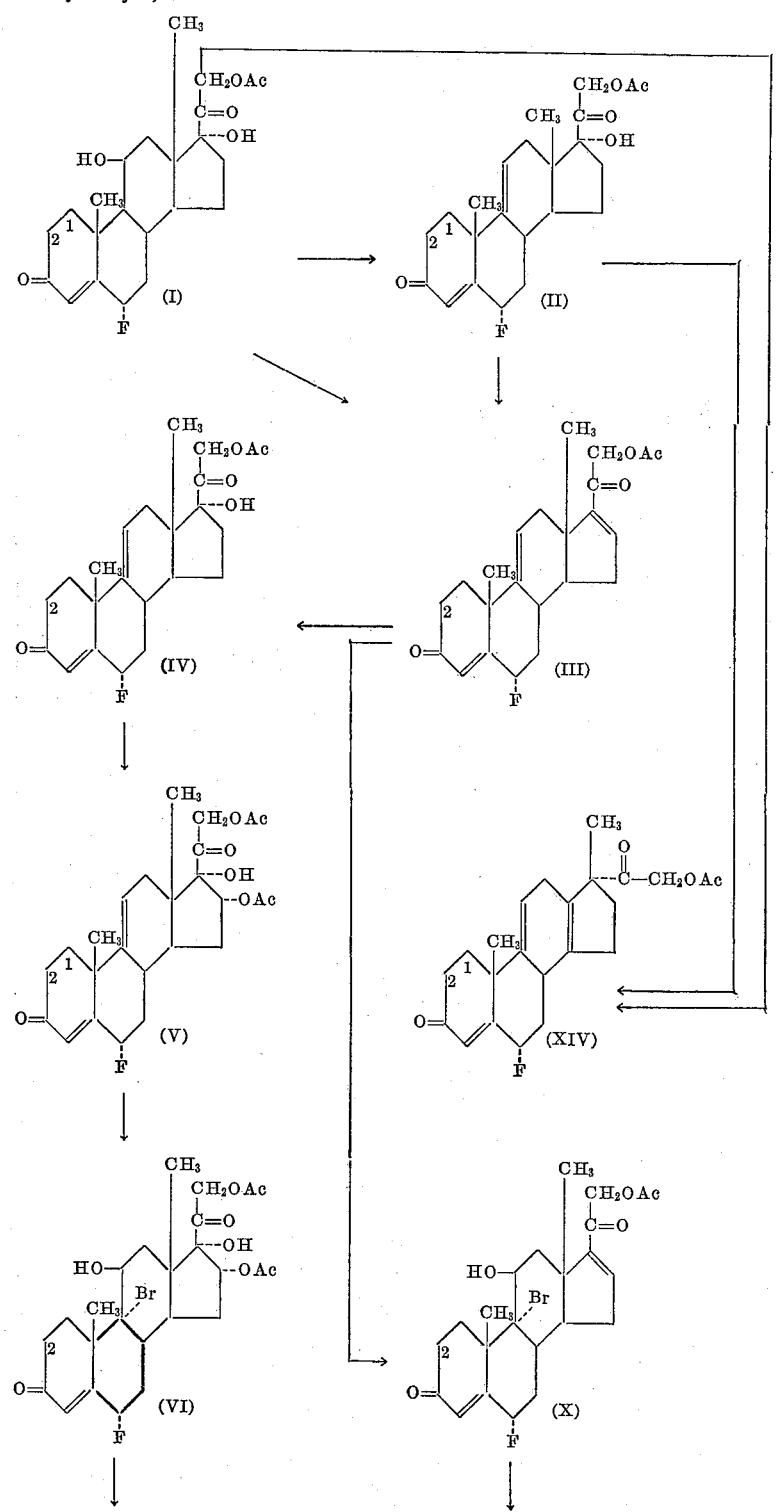

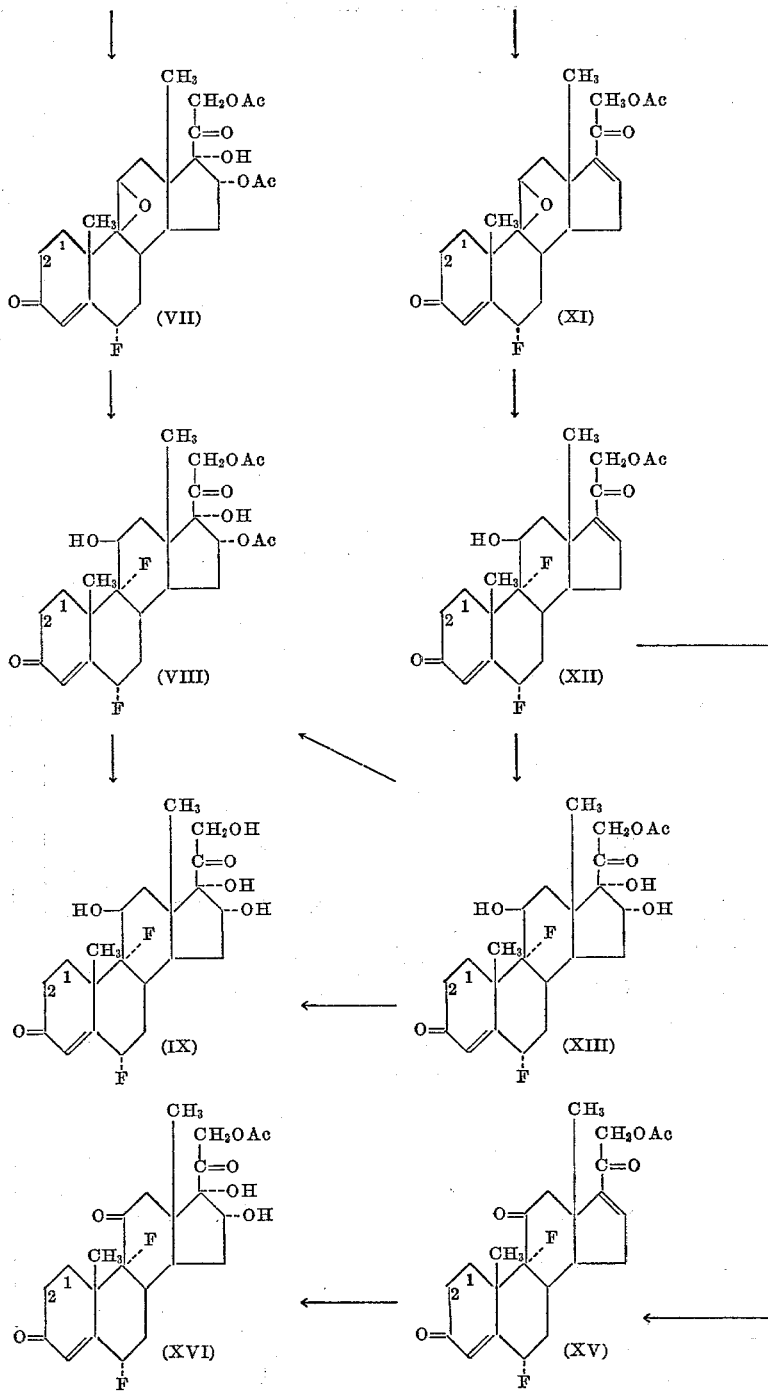

wherein the 1,2-carbon atom linkage is selected from the group consisting of single bonds and double bonds and Ac is the acyl radical of an organic carboxylic acid containing from one to twelve carbon atoms, inclusive.

The novel compounds of this invention embraced by Formulae III to VII, X to XIII, XV and XVI of the above flow-sheet possess valuable pharmacological properties, particularly anti-inflammatory activity of improved therapeutic ratio, i.e., with decreased relative degree of side effects such as weight loss, sodium retention, ulcer formation, calcium loss, adrenal and pituitary inhibition and the like, present in certain known physiologically active steroids. The anti-inflammatory activity of the compounds of the above formulae renders them useful in the treatment of various inflammatory conditions of the skin, eyes, respiratory tract, bones and internal organs due to the bacterial or viral infections, contact dermatitis, allergic reactions and rheumatoid arthritis. The compounds of the aforesaid formulae are also useful as intermediates in the preparation of the physiologically active compounds of Formula IX, which includes the known highly effective anti-inflammatory agent, 6α,9α-difluoro - 11β,16α,17α,21 - tetrahydroxy-1,4-pregnadiene-3,20-dione (IX). This compound is especially valuable where long-term administration of an anti-inflammatory medicament is necessary, inasmuch as its "calcium sparing" properties prevent depleting the bones of calcium and consequently avoid osteoporosis which results from continued administration of certain other commonly employed corticoids. The novel compounds potentiate the emulsifying efficiency of fats.

The compounds represented by Formula XIV are useful as intermediates for the preparation of biologically active compounds and also possess anti-estrogenic, central nervous system depressing and salt regulating properties.

The compounds of the present invention can be prepared and administered to mammals, birds, humans, and animals in a wide variety of oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages.

The known, therapeutically valuable compounds represented by Formula IX are prepared from the known steroids of Formula I by methods A or B that follow.

METHOD A

The key intermediates of Formula III, namely, 6α-fluoro-21-hydroxy-1,4,9(11),16-pregnatetraene-3,20-dione-21-acylates (III) and the corresponding 4,9(11),16-pregnatrienes (III) can be prepared by dehydration of the known compounds 6α-fluoro-11β,17α,21-trihydroxy-1,4-pregnadiene-3,20-dione 21-acylates (I) (prepared as in U.S. Patent 2,841,600) and the corresponding 4-pregnenes (I) (prepared as in U.S. Patent 2,838,532), respectively. The dehydration of the compounds represented by Formula I is advantageously carried out using an N-haloamide or N-haloimide and anhydrous sulfur dioxide in a basic medium in accordance with the process described in U.S. Patent 3,005,834. In all cases it is desirable to employ at least an equimolar amount of anhydrous sulfur dioxide with respect to N-haloamide or N-haloimide and preferably the anhydrous sulfur dioxide is present in excess of this amount. Preferably the dehydration is carried out using N-bromoacetamide as the N-haloamide in the presence of pyridine. Using the compounds of Formula I as starting materials for preparing those of III, it is necessary to employ at least 2 moles of N-haloamide (or N-haloimide) per mole of starting steroid in order to obtain the desired compound (III). However, when the 2 moles of N-haloamide is added in one portion to the compounds of I followed by sulfur dioxide, this "one-pot" dehydration yields mainly a 6α-fluoro-17β-methyl-21-acyloxy-1,4,9(11),13(14)-17α-18-pregnatetraene-3,20 dione (XIV) [or a corresponding 4,9(11),13(14)-triene (XIV)] and a minor amount of III. The "one-pot" double dehydration, eliminating both the 11β- and 17α-hydroxyl groups, is feasible when the N-haloamide (followed by sulfur dioxide) is added in portions such that the more facile 11β-dehydration yielding a 6α-fluoro-17α,21-dihydroxy-1,4,9(11)-pregnatriene-3,20-dione 21-acylate (II) [or a corresponding 4,9(11)-pregnadiene (II)] is allowed to proceed to completion first; the addition of about another mole or more of N-haloamide (followed by sulfur dioxide) to the reaction mixture produces substanial amounts of a 6α-fluoro-21-hydroxy-1,4,9(11),16-pregnatetraene-3,20-dione 21-acylate (III) and a corresponding 1-saturated compound (III) along with those of Formula XIV. Alternatively, about 1 mole of the compounds of Formula I can be dehydrated solely at the 9(11)-position by reaction with about 1 mole of N-haloamide (followed by addition of sulfur dioxide) to yield about 1 mole of a 6α-fluoro-17α,21-dihydroxy-1,4,9(11)-pregnatriene-3,20-dione 21-acylate (II) [or a corresponding 4,9(11)-pregnadiene (II)]; the thus produced compounds of II, by reaction with about an additional mole of N-haloamide and sulfur dioxide, dehydrates the 17α-hydroxyl function to give mainly a 6α-fluoro-21-hydroxy-1,4,9(11),16-pregnatetraene-3,20-dione 21-acylate (III) and a corresponding 4,9(11),16-pregnatriene (III).

The next step of the process involves hydroxylation at the 16α- and 17α-positions of the above-produced compounds of Formula III, e.g., by reaction with potassium permanganate, or with sodium periodate (and a catalytic amount of osmium tetroxide), to yield a 6α-fluoro-16α,17α,21-trihydroxy-1,4,9(11)-pregnatriene-3,20-dione 21-acylate (IV) and a corresponding 4,9(11)-pregnadiene (IV).

The remaining steps of the synthesis, namely, the introduction of the 9α-fluoro and 11β-hydroxy groups into the structure of the above-produced compounds of Formula IV, indicated by the sequence: Formula IV→V→VI→VII→VIII of the flow-sheet is achieved by employing standard reactions which can be readily effected by utilizing the procedures described in, e.g., U.S. Patent 2,852,511. The thus produced compounds of Formula VIII, namely, 6α,9α-difluoro-11β,16α,17α,21-tetrahydroxy-1,4-pregnadiene-16,21-diacylates (VIII) and the corresponding 4-pregnenes (VIII) can be converted to their free alcohols (IX) by hydrolysis in accordance with general hydrolysis procedures known in the art. The 11β-hydroxy compounds of Formula VIII can be oxidized to the corresponding 11-ketones with an oxidizing agent such as chromic acid, potassium dichromate, a N-haloamide, and the like.

METHOD B

The intermediates represented by Formula III are prepared in the same manner as described in Method A, above. The thus produced 6α-fluoro-21-hydroxy-1,4,9(11),16-pregnatetraene-3,20-dione 21-acylates (III) and the corresponding 1-saturated compounds (III) are readily converted to the corresponding compounds of Formula XII, i.e., 6α,9α-difluoro-11β,21-dihydroxy-1,4,16-pregnatriene-3,20-dione 21-acylates (XII) and the corresponding 1-saturated compounds (XII) (shown by the sequence: Formula III→X→XI→XII of the flow-sheet) by the use of methods well known in the steroid art,. e.g., in the manner disclosed in U.S. Patent 2,852,511.

The next step of the process comprises hydroxylation at the 16α- and 17α-positions of the thus produced 6α,9α-difluoro-11β,21-dihydroxy 1,4,16-pregnatriene-3,20-dione 21-acylates (XII) and the corresponding 4,16-pregnadienes (XII), e.g., by reaction with potassium permanganate or osmium tetroxide, to yield the 6α,9α-difluoro-11β,16α,17α,21-tetrahydroxy-1,4-pregnadiene-3,20-dione 21-acylates (XIII) and the corresponding 1-saturated derivatives (XIII).

The above-produced 21-acylates (XIII) can be converted to their corresponding 16α,21-diacylates (VIII) under esterification conditions known in the art, for example, by the reaction of the 16α-hydroxy compounds (XIII) with the anhydride of an organic carboxylic acid. The 21-acylates represented by Formula XIII can be converted to their corresponding free alcohols, namely, 6α,9α-difluoro-11β,16α,17α,21-tetrahydroxy-1,4-pregnadiene-3,20-dione (IX) and its corresponding 4-pregnene (IX) by hydrolysis in accordance with general hydrolysis procedures known in the art, e.g., by reaction of the 21-acylates (XIII) with an alkali-metal carbonate or bicarbonate in a substantially oxygen-free solution of a mixture of a lower-alkanol and water.

The 11β-hydroxy compounds of Formula XII can be oxidized to the corresponding 11-ketones, i.e., 6α,9α-difluoro-hydroxyl-1,4,16-pregnatriene-3,11,20-trione 21-acylates (XV) and the corresponding 4,16-pregnadienes (XV) by oxidizing agents such as chromic acid, potassium dichromate and the like, by employing procedures well known in the steroid art. The thus-obtained compounds of Formula XV are subjected to 16α,17α-dihydroxylation e.g., by reaction with potassium permanganate or osmium textroxide, to yield 6α,9α-difluoro-16α,17α,21-trihydroxy-1,4-pregnadiene-3,11,20-trione 21-acylates (XVI) and the corresponding 4-pregnenes (XVI). The thus produced 21-acylates (XVI) can be converted to their corresponding 16α,21-diacylates under esterification conditions known in the steroid art, e.g., by the reaction of the 16α-hydroxy compounds (XVI) with the anhydride of an organic carboxylic acid. The 21-acylates represented by Formula XVI can be converted to their corresponding free alcohols, namely, 6α,9α-difluoro-16α,17α,21-trihydroxy-1,4-pregnadiene-3,11,20-trione and the corresponding 4-pregnenes by hydrolysis in accordance with general procedures known in the art, e.g., by reaction of the 21-acylates (XVI) with an alkali-metal carbonate or bicarbonate in a substantially oxygen-free solution of a mixture of a lower-alkanol and water.

*Example 1*

6α - FLUORO - 21 - HYDROXY - 1,4,9(11),16 - PREGNATETRAENE - 3,20 - DIONE 21 - ACETATE (III) AND 6α-FLUORO - 17β - METHYL - 21 - ACETOXY - 1,4,9(11),13(14) - 17α - 18 - NORPREGNATETRAENE - 3,20-DIONE (XIV)

A mixture of 50 g. of 6α-fluoro-11β,17α,21-trihydroxy-1,4-pregnadiene-3,20-dione 21-acetate (I) prepared as in U.S. Patent 2,841,600, 250 ml. of pyridine and 22 g. of N-bromoacetamide was stirred for a period of about 10 minutes, then cooled in an ice-bath and saturated with gaseous sulfur dioxide while the temperature was kept below 30° C. While the temperature was kept between from about 25 to about 30° C., a further portion of 40 g. of N-bromacetamide in 150 ml. of pyridine was added, the ice-bath removed and the dark solution stirred for a period of about 15 minutes. The mixture was then cooled and saturated with sulfur dioxide gas. After standing for about 15 minutes, the mixture was poured into 3 l. of ice-water with stirring. The precipitated product was collected on a filter, washed with water and sucked dry. The crude material was dissolved in benzene and poured onto a chromatographic column containing 3 lbs. of acid-washed alumina. The column was eluted with 20 l. of a mixture of 1 percent acetone and 99 percent benzene, 10 l. of 5 percent acetone—95 percent benzene and 2 l. of 100 percent acetone. The eluate was collected in 1 l. fractions and evaporated. Infrared analysis showed that the product (15.1 g.) was contained in fractions 14 to 28. Crystallization from a mixture of acetone and Skellysolve B (hexanes) gave 11 g. of pure 6α-fluoro-21-hydroxy-1,4,9(11),16-pregnatetraene-3,20-dione 21-acetate (III) with a melting point of 191 to 193° C. and 1.25 g. melting at 184 to 190° C. for a total yield of 26.3 percent.

From fractions 4 to 13 weighing 16.3 g., after crystallization, there was obtained 7.57 g. of the Wagner-Meerwein rearrangement by-product, 6α - fluoro - 17β-methyl - 21 - acetoxy - 1,4,9(11),13(14),17α - 18 - norpregnatetraene - 3,20 - dione (XIV), melting at 167 to 171° C.

The acetone fractions contained 2.59 g. of crystalline 6α - fluoro - 17α,21 - dihydroxy - 1,4,9(11) - pregnatriene-3,20-dione 21-acetate (II), melting at 212 to 214° C.

*Example 2*

6α-FLUORO-21-HYDROXY-1,4,9(11),16-PREGNATETRAENE-3,20-DIONE 21-ACETATE (III)

(a) To a solution of 1.05 g. of 6α-fluoro-11β,17α,21-trihydroxy - 1,4 - pregnadiene - 3,20 - dione 21 - acetate (I) in 10 ml. of pyridine, 0.517 g. of N-bromoactamide was added and allowed to stand for a period of about 15 minutes. The reaction mixture was then cooled to about 5° C. and while stirring, sulfur dioxide gas was passed over the surface until the solution gave no color change with acidified starch-iodide paper. The temperature of the reaction mixture was not permitted to rise above 20° C. during the addition of gas. The solution was gradually poured into water and the resulting crystalline product isolated to give 0.98 g. of product (II), which melted at 186 to 196° C. An analytical sample of this material, 6α-fluoro-17α,21-dihydroxy-1,4,9(11) - pregnatriene - 3,20 - dione 21 - acetate (II), melted at 213 to 216° C. (decomposition); rotation [α]$_D$ +34° (acetone).

*Analysis.*—Calcd. for $C_{23}H_{27}O_5F$: C, 68.64; H, 6.76; F, 4.72. Found: C, 68.56; H, 6.86; F, 4.72.

(b) A solution of 10 g. of 6α-fluoro-17α,21-dihydroxy-1,4,9(11)-pregnatriene-3,20-dione 21-acetate (II) [from (a) above] in 28 ml. of pyridine was stirred at room temperature while all of a solution of 5.6 g. of N-bromoacetamide in 23 ml. of pyridine was added quickly in one portion. The mixture was stirred in the dark for about 15 minutes, then cooled to about 10° C. and added slowly to 25 ml. of a saturated solution of sulfur dioxide in pyridine cooled to about 10° C. After this addition the mixture stirred for about one-half hour with the cooling bath removed. It was then poured slowly into ice-water with stirring. The product was filtered, washed with water, dried and then chromatographed over a column of 500 g. of Merck, acid-washed alumina; it was eluted with 1 l. each of benzene, 5 percent, 10 percent, 15 percent, 20 percent, 25 percent acetone in benzene and finally 500 ml. of acetone. The peak eluted with 5 percent and 10 percent acetone-benzene contained 5.33 g. of solids and was recrystallized from acetone-Skellysolve B to give 3.27 g. of product with a melting point of 147 to 183° C. Recrystallization of this material gave 2.4 g. of product with a melting point of 173 to 188° C. From this an analytical sample of pure 6α-fluoro-21-hydroxyl-1,4,9(11),16-pregnatetraene-3,20-dione 21-acetate (III) was obtained which melted at 188 to 190° C.; λ max. 238 mμ (ε=24,300); rotation [α]$_D$ +112° (chloroform); ν=1746, 1678, 1637, 1611, 1582, 1240, 1223 cm.$^{-1}$.

*Analysis.*—Calcd. for $C_{23}H_{25}O_4F$: C, 71.85; H, 6.56; F, 4.94. Found: C, 72.05; H, 6.46; F, 4.62.

The later fractions from the column contained 2.7 g. of crystalline material and were shown by infrared absorption spectra to consist of starting material (II), which could not be separated from the product (III) by Florisil (synthetic magnesium silicate) chromatography.

*Example 3*

6α-FLUORO-16α,17α,21-TRIHYDROXY-1,4,9(11)-PREGNATRIENE-3,20-DIONE 21-ACETATE (IV)

To a stirred ice-cold solution of 0.5 g. of 6α-fluoro-21 - hydroxy - 1,4,9(11),16 - pregnatetraene - 3,20 - dione 21-acetate (III) in 14.25 ml. of acetone and 0.142 ml. of acetic acid, a solution of 230 mg. of potassium permanganate in 8 ml. of water and 42.5 ml. of acetone was added during 1.5 minutes. After the addition of the potassium permanganate solution was completed, sulfur dioxide gas was bubbled into the solution until the brown color was discharged. The solution was concentrated in vacuo, extracted with ethyl acetate, washed, dried, and the liquid evaporated. The residue was crystallized from a mixture of acetone and Skellysolve B and yielded 90 mg. of 6α-fluoro-16α,17α,21-trihydroxy-1,4,9(11) - pregnatriene - 3,20 - dione 21 - acetate (IV) with a melting point of 190 to 193° C., λ max. 238 mμ (ε=15,300) and an infrared absorption spectrum consistent with the expected structure.

*Analysis.*—Calcd. for $C_{23}H_{27}O_6F$: C, 66.01; H, 6.50; F, 4.54. Found: C, 65.43; H, 6.54; F, 4.52.

*Example 3A*

6α-FLUORO-16α,17α,21-TRIHYDROXY-1,4,9(11)-PREGNATRIENE-3,20-DIONE 21-ACETATE (IV)

A vigorously stirred solution of 5 g. of 6α-fluoro-21-hydroxy - 1,4,9(11),16 - pregnatetraene - 3,20 - dione 21-acetate (III) in 140 ml. of acetone and 1.4 ml. of acetic acid was cooled to −20° C. with solid carbon dioxide (Dry-Ice) in methanol and treated over a period of about 1.5 minutes with an equally cold solution of 2.3 g. of potassium permanganate in 50 ml. of water and 420 ml. of acetone. The solution was immediately treated with gaseous sulfur dioxide until the color was discharged. The colorless solution was concentrated in vacuo, extracted with ethyl acetate, washed, dried and the solvent evaporated. The gummy residue was dissolved in methylene chloride and chromatographed on a 250 g. column of Florisil. The column was eluted with twenty 500 ml. fractions of a mixture of 15 percent acetone–85 percent Skellysolve B and five 500 ml. fractions of 25 percent acetone–75 percent Skellysolve B. Fractions 3 to 12 containing 2.56 g. of solid material were combined and recrystallized from acetone-Skellysolve B to give 2.06 g. (38 percent yield) of 6α-fluoro-16α,17α,21 - trihydroxy - 1,4,9(11) - pregnatriene - 3,20-dione 21-acetate (IV) having a melting point of 190 to 195° C.

*Example 3B*

6α-FLUORO-16α,17α,21-TRIHYDROXY-1,4,9(11)-PREGNATRIENE-3,20-DIONE 21-ACETATE (IV)

To a stirred solution of 0.75 g. of 6α-fluoro-21-hydroxy-1,4,9(11),16-pregnatetraene-3,20-dione 21-acetate (III) in 38 ml. of tetrahydrofuran, 7.5 mg. of osmium tetroxide and a solution of 0.48 g. of sodium periodate in 7.5 ml. of water and 0.48 g. of sodium acetate was added. After stirring the mixture for a period of about 15 hours, during which time a white precipitate formed, the mixture was diluted with water, extracted with methylene chloride, dried and the solvent evaporated. The residue was adsorbed from methylene chloride on a column of 50 g. of Florisil. Elution with 15 percent acetone in Skellysolve B gave 427 mg. of partly crystalline solid, which after crystallization from a mixture of acetone and Skellysolve B gave 290 mg. (30 percent yield) of 6α-fluoro-16α,17α,21 - trihydroxy-1,4,9(11)-pregnatriene-3,20-dione 21-acetate (IV), melting at 190 to 195° C.

*Example 4*

6α-FLUORO-17β-METHYL-21-ACETOXY-1,4,9(11),13(14)-17α-18-NOR-PREGNATETRAENE-3,20-DIONE (XIV)

A solution of 500 mg. of 6α-fluoro-11β,17α,21-trihydroxy-1,4-pregnadiene-3,20-dione 21-acetate (I) in 5 ml. of pyridine was mixed with 1 g. of N-bromoacetamide in 4 ml. of pyridine at a temperature of about 25° C. After standing for about 5 minutes, the solution was added dropwise to 6 ml. of a saturated solution of sulfur dioxide in pyridine while cooling with a cold-water bath. This solution was then poured slowly into stirred ice-water, filtered, washed and dried to give 485 mg. of product material. This was chromatographed on a 40 g. column of Florisil and eluted with 2 l. of 5 to 25 percent acetone in Skellysolve B. One peak from the column weighing 280 mg. was combined, recrystallized from acetone-Skellysolve B and melted at 163 to 166° C. On recrystallization the product melted at 166 to 169° C. and had an absorption λ max. 237 mμ (ε=15,820), and nuclear magnetic resonance and infrared spectra consistent with the structure of 6α-fluoro-17β-methyl-21-acetoxy-1,4,9(11),13(14) - 17α - 18-nor-pregnatetraene-3,20-dione (XIV).

*Analysis.*—Calcd. for $C_{23}H_{25}O_4F$: C, 71.85; H, 6.56; F, 4.94. Found: C, 70.87; H, 6.54; F, 4.44.

*Example 5*

6α-FLUORO-16α,17α,21-TRIHYDROXY-1,4,9(11)-PREGNATRIENE-3,20-DIONE 16,21-DIACETATE (V)

A mixture of 16.69 g. of 6α-fluoro-16α,17α,21-trihydroxy-1,4,9(11)-pregnatriene-3,20-dione 21-acetate (IV), 40 ml. of acetic anhydride and 40 ml. of pyridine was allowed to stand for a period of about 15 hours until the acetylation was completed. The orange-amber colored solution was poured into 1.5 l. of ice-water with stirring to give an initially gummy solid which hardened on standing. The product was separated, washed and dried to give 18.42 g. (100 percent yield) of material melting at 130 to 144° C. A sample was recrystallized for analysis from a mixture of methanol and methylene chloride to give needles of pure 6α-fluoro-16α,17α,21-trihydroxy-1,4,9(11)-pregnatriene-3,20-dione 16,21-diacetate (V) with a melting point of 147 to 149° C. and ultraviolet absorption λ max. 237.5 mμ (ε=16,200).

*Analysis.*—Calcd. for $C_{25}H_{29}O_7F$: C, 65.20; H, 6.35; F, 4.13. Found: C, 65.16; H, 6.64; F, 4.01.

*Example 6*

6α-FLUORO-9β,11β-EPOXY-16α,17α,21-TRIHYDROXY-1,4-PREGNADIENE-3,20-DIONE 16,21-DIACETATE (VII)

(a) To a stirred solution of 18.17 g. of crude 6α-fluoro-16α,17α,21 - trihydroxy-1,4,9(11)-pregnatriene-3,20-dione 16,21-diacetate (V) in 280 ml. of methylene chloride and 920 ml. of t-butyl alcohol, there was added, in order, a solution of 47.6 ml. of 70% perchloric acid in 308 ml. of water and a solution of 6.32 g. of N-bromoacetamide in 280 ml. of t-butyl alcohol. The mixture was stirred for a period of about 15 minutes, treated with a solution of 9.5 g. of sodium sulfite in 700 ml. of water and concentrated at reduced pressure on a warm water bath to a volume of approximately 1.5 l. The product separated as a gum which was extracted into methylene chloride, which was washed with sodium bicarbonate solution, dried and evaporated to yield an amber-colored foam. Thin layer chromatography of a sample of the product on alumina, developed with ethyl acetate/cyclohexane (3:1), showed only a single (black) spot moving just behind the starting material control (reddish-brown) and indicated the formation of the desired product, 6α-fluoro-9α - bromo-11β,16α,17α,21-tetrahydroxy-1,4-pregnadiene-3,20-dione 16,21-diacetate (VI).

(b) The total crude bromohydrin (VI), 28 g. of potassium acetate and 500 ml. of acetone were stirred and heated under reflux for a period of about 20 hours when the epoxidation was completed. The mixture was evaporated under reduced pressure and the residue extracted with methylene chloride. The extract was filtered onto a chromatographic column containing 800 g. of Florisil and the column eluted with five 1500 ml. fractions of a mixture of 10 percent acetone and 90 percent Skellysolve B, twenty 1500 ml. fractions of 15 percent acetone–85 percent Skellysolve B and five 1500 ml. fractions of 25 percent acetone–75 percent Skellysolve B. Fractions 9 to 23 contained 14.45 g. of crystalline epoxide (VII) (77 percent of theoretical) based on thin layer chromatography mobility (Silica Gel with ethyl acetate/cyclohexane [3:1] development). Fractions 24 to 48 contained 2.75 g. of material consisting mainly of unchanged bromohydrin (VI). A sample of the epoxide (VII) was recrystallized from methylene chloride-Skellysolve B, then acetone-Skellysolve B to give prisms of pure 6α-fluoro-9β,11β-epoxy - 16α,17α,21-trihydroxy-1,4-pregnadiene-3,20-dione 16,21-diacetate (VII), with a melting point of 221 to 223° C., ultraviolet absorption max. 247.5 mμ (ε=16,600), infrared absorption at 3470, 1750, 1745, 1725, 1675, 1640, 1615, 1250, 1080, 1090 and 1050 cm.⁻¹ and in agreement with the expected structure.

*Analysis.*—Calcd. for $C_{25}H_{29}O_8F$: C, 63.01; H, 6.13; F, 3.99. Found: C, 63.10; H, 6.56; F, 3.97.

*Example 7*

6α,9α - DIFLUORO - 11β,16α17α,21 - TETRAHYDROXY-1,4-PREGNADIENE-3,20-DIONE 16,21-DIACETATE (VIII)

Thirty-two grams of anhydrous hydrogen fluoride was condensed in a polyethylene bottle with (Dry-Ice) cooling and treated cautiously successively with 10 ml. of cold methylene chloride, 57 ml. of cold tetrahydrofuran and a cold solution of 14.1 g. of crude 6α-fluoro-9β,11β-epoxy - 16α,17α,21 - trihydroxy - 1,4 - pregnadiene - 3,20-dione 16,21-diacetate (VII) in 60 ml. of methylene chloride. The reaction mixture was kept at about +5° C. for about three days at which time the fluorination was completed, then the mixture was poured into 130 g. of iced sodium bicarbonate solution and extracted with methylene chloride. The extract was washed, dried and evaporated. Upon slurrying with additional methylene chloride, crystals were formed. These were separated and recrystallized from a mixture of acetone and Skellysolve B to give 4 g. of solid material with a melting point of 227 to 229° C. (decomposition). The mother liquors were evaporated, the residue combined with the methylene chloride filtrate from above and chromatographed on a 750 g. column of Florisil. The column was eluted with five 1500 ml. fractions of a mixture of 10 percent acetone and 90 percent Skellysolve B, ten 1500 ml. fractions of 25 percent acetone–75 percent Skellysolve B and stripped with acetone. The residues from fractions 17 to 26 weighing 6.43 g. were combined and recrystallized from acetone-Skellysolve B to give three crops of crystals: (1) 3.24 g. melting at 227 to 228° C. (decomposition); (2) 1.89 g. melting at 224 to 226° C. (decomposiiton); (3) 0.46 g. melting at 218 to 222° C. (decomposition). Together with the 4 g. obtained above by direct crystallization the yield was 9.59 g. (65 percent of theoretical) of 6α,9α - difluoro - 11β,16α,17α,21 - tetrahydroxy - 1,4-pregnadiene-3,20-dione 16,21-diacetate (VIII).

Analysis.—Calcd. for $C_{25}H_{30}O_8F_2$: C, 60.47; H, 6.09; F, 7.65. Found (first crop): C, 60.20; H, 6.12; F, 6.99. This analytical sample of the first crop of crystals had an ultraviolet absorption spectrum maximum at 238 mμ (ε=15,600); an infrared absorption spectrum in agreement with the proposed structure, i.e., 3560, 3380, 1745, 1730, 1665, 1625, 1610, 1230 and 1060 cm.$^{-1}$. This sample was dried at 100° C. in vacuo for 20 hours, since the compound was reported (J. Amer. Chem. Soc. 82, 3399 [1960]) to be a tenacious water solvate with a melting point of 222 to 224° C.

*Example 8*

6α,9α-DIFLUORO-11β,16α,17α,21-TETRAHYDROXY-1,4-PREGNADIENE-3,20-DIONE (IX)

A solution of 9.59 g. of 6α,9α-difluoro-11β,16α,17α,21-tetrahydroxy - 1,4 - pregnadiene - 3,20 - dione 16,21 - diacetate (VIII) in 959 ml. of methanol was purged of oxygen by bubbling nitrogen therethrough for about 10 minutes. To this was added 26.7 ml. of a similarly purged 10 percent potassium carbonate solution and the mixture allowed to stand for about 15 minutes when the hydrolysis was completed. To this mixture 9.6 ml. of acetic acid in 180 ml. of water was added, followed by concentration under reduced pressure to about one-fifth of the original volume. The product was recovered by filtration, washed with water and dried to yield 6.85 g. (86 percent of theoretical) of white crystalline solid. Recrystallization from a mixture of ethyl acetate, methanol and Skellysolve B gave three crops of crystals of 6α,9α-difluoro - 11β,16α,17α,21 - tetrahydroxy - 1,4 - pregnadiene-3,20-dione (IX): (1) 3.80 g. of prisms melting at 264 to 267° C. (decomposition); (2) 1.90 g. melting at 260 to 267° C. (decomposition); (3) 0.47 g. melting at 225 to 266° C. (decomposition). Each crop exhibited but a single spot about 1 inch from the origin on Silica Gel (amorphous silica) using thin layer chromatography employing ethyl acetate development.

Analysis.—Calcd. for $C_{21}H_{26}O_6F_2$: C, 61.15; H, 6.36; F, 9.21. Found (first crop): C, 61.40; H, 6.45; F, 8.88. This analytical sample of the first crop of crystals had an ultraviolet spectrum absorption maximum at 238 mμ (ε=16,450); an infrared absorpiton spectrum in agreement with the proposed structure, i.e., 3615, 3400, 1720, 1672, 1615, 1125, and 1071 cm.$^{-1}$. This sample was dried at 100° C. in vacuo. The compound was reported (J. Amer. Chem. Soc. 82, 3399 [1960]) to have a melting point of 266 to 268° C., [α]$_D$ +43° (dioxane), λ alc. max. 238 mμ and to be methanol solvated.

*Example 9*

6α,9α-DIFLUORO-11β,21-DIHYDROXY-1,4,16-PREGNATRIENE-3,20-DIONE 21-ACETATE (XII)

(a) A solution of 3 g. of 6α-fluoro-21-hydroxy-1,4,9(11),16-pregnatetraene-3,20-dione 21-acetate (III) in 45 ml. of methylene chloride and 180 ml. of t-butyl alcohol was treated while stirring with a solution of 9 ml. of 70 percent perchloric acid in 60 ml. of water and a solution of 1.2 g. of N-bromoacetamide in 45 ml. of t-butyl alcohol. After about 15 minutes a solution of 1.8 g. of sodium sulfite in 100 ml. of water was added to the mixture which was then concentrated at reduced pressure. The product separated as a gum which was extracted into methylene chloride, dried and evaporated to give a yellow gummy material. Thin layer chromatography on Silica Gel with ethyl acetate/cyclohexane (2:1) development showed a single spot moving just slower than the starting material (II) and indicated the formation of the desired compound, 6α-fluoro-9α-bromo-11β,21-dihydroxy-1,4,16-pregnatriene-3,20-dione 21-acetate (X).

(b) A mixture of the crude bromohydrin (X), 6 g. of potassium acetate and 150 ml. of acetone was heated under reflux with stirring for about 22 hours. Evaporation to dryness at reduced pressure and extraction with methylene chloride gave a gummy product which was chromatographed on a 150 g. column of Florisil. Elution with 5, 7.5 and 10 percent mixtures of acetone in Skellysolve B gave 1.94 g. of crude 6α-fluoro-9β,11β-epoxy-21-hydroxy - 1,4,16 - pregnatriene - 3,20 - dione 21 - acetate (XI) as determined by thin layer chromatography on Silica Gel using ethyl acetate/cyclohexane (2:1) development. Elution with 15 percent acetone-Skellysolve B gave 0.44 g. of unreacted bromohydrin (X) which was recycled as above to yield 0.25 g. of additional epoxide (XI). The total yield of epoxide (XI) was 2.19 g. [70 percent of theoretical from the starting steroid (III)].

(c) A cold solution of the total crude epoxide (XI) in 25 ml. of methylene chloride was added to a solid carbon dioxide chilled mixture of 4 g. of anhydrous hydrogen fluoride, 7.2 ml. of tetrahydrofuran and 5 ml. of methylene chloride. The reddish solution was kept at about +5° C. for about 20 hours. However, since most of the epoxide (XI) was recovered unchanged, the reaction was repeated using 6.8 g. of hydrogen fluoride, 12.2 ml. of tetrahydrofuran, the recovered epoxide (XI) and 25 ml. of methylene chloride. After about 120 hours at +5° C., the reaction was quenched in iced aqueous sodium bicarbonate solution, and the product extracted with additional methylene chloride. The extract was dried, evaporated and the residue purified by chromatography on a 100 g. column of Florisil. Elution with 7.5 and 10% acetone in Skellysolve B gave amorphous materials containing some unreacted epoxide (XI). From 15 to 20% acetone-Skellysolve B eluates there was obtained 979 mg. of crude product (XII) which after recrystallization from acetone-Skellysolve B yielded 0.49 g. of colorless rods melting at 209 to 210° C. and 0.1 g. melting at 202 to 209° C. A portion of the first crop was recrystallized from acetone-Skellysolve B and gave pure 6α,9α-difluoro-11β,21-dihydroxy-1,4,16-pregnatriene-3,20-dione 21-acetate (XII) without change in melting point, ultraviolet absorption maximum at 238 mμ (ε=25,750), infrared absorption maxima: 3540, 3060, 1735, 1680, 1670, 1630, 1615, 1255, 1225, 1175, 1150 and 1070 cm.$^{-1}$.

Analysis.—Calcd. for $C_{23}H_{26}O_5F_2$ (dried at 100° C. in vacuo): C, 65.70; H, 6.23; F, 9.04. Found: C, 65.73; H, 6.29; F. 8.53.

*Example 10*

6α,9α - DIFLUORO-11β,16α,17α,21 - TETRAHYDROXY - 1,4-PREGNADIENE-3,20-DIONE 21-ACETATE (XIII)

A solution of 0.48 g. of 6α,9α-difluoro-11β,21-dihydroxy-1,4,16-pregnatriene-3,20-dione 21-acetate (XII) in 14 ml. of acetone and 0.14 ml. of acetic acid was cooled to about −15° C. in a methanol-ice bath and treated with an equally cold solution of 0.23 g. of potassium permanganate in 5 ml. of water and 42 ml. acetone with vigorous stirring. The complete addition was made at a uniform rate during about 1.5 minutes, after which the solution was immediately decolorized with sulfur dioxide gas, concentrated to a small volume under reduced pressure and filtered to yield 0.49 g. of solid material. Crystallization from a mixture of acetone and Skellysolve B gave 0.18 g. of crystals which showed the expected polarity by thin layer chromatography (silica gel with ethyl acetate/cyclohexane (2:1) development). The material was further recrystallized from ethyl acetate and Skellysolve B to yield fluffy needles of 6α,9α-difluoro-11β,16α,17α,21-tetrahydroxy-1,4-pregnadiene-3,20-dione 21-acetate (XIII), with a melting point of 222 to 225° C. (decomposition), ultraviolet absorption maximum 238 mμ (ε=16,250) infrared absorption maxima at 3485, 3330, 1740, 1723, 1711, 1660, 1620, 1605, 1246 and 1070 cm.$^{-1}$.

*Analysis.*—Calcd. for $C_{23}H_{28}O_7F_2$ (dried at 100° C. in vacuo): C, 60.78; H, 6.21; F, 8.36. Found: C, 60.38; H, 6.38; F, 8.42.

*Example 11*

6α,9α-DIFLUORO-21-HYDROXY-1,4,16-PREGNATRIENE-3,11,20-TRIONE 21-ACETATE (XV)

To a solution of 0.5 g. of 6α,9α-difluoro-11β,21-dihydroxy-1,4,16-pregnatriene-3,20-dione 21-acetate (XII) in 20 ml. of acetic acid is added a solution of 0.15 g. of chromium trioxide in 0.5 ml. of water. The mixture is stirred and maintained at a temperature of about 25° C. for a period of about 4 hours. The excess chromium trioxide oxidant is destroyed by the addition of 0.5 ml. of methanol and the mixture poured into 100 ml. of water and extracted with methylene chloride. The extract is washed with dilute sodium carbonate, water, dried and evaporated to dryness. The residue is crystallized from acetone to give light-colored, crystalline 6α,9α-difluoro-21-hydroxy-1,4,16-pregnatriene-3,11,20-trione 21-acetate (XV).

*Example 12*

6α,9α-DIFLUORO-16α,17α,21-TRIHYDROXY-1,4-PREGNADIENE-3,11,20-TRIONE 21-ACETATE (XVI)

Following the procedure of Example 10, but substituting 6α,9α-difluoro-21-hydroxy-1,4,16-pregnatriene-3,11,20-trione 21-acetate (XV) as starting material, yields light-colored, crystalline 6α,9α-difluoro-16α,17α,21-trihydroxy-1,4-pregnadiene-3,11,20-trione 21-acetate (XVI).

*Example 13*

6α,9α-DIFLUORO-11β,16α,17α,21-TETRAHYDROXY-1,4-PREGNADIENE-3,20-DIONE 16,21-DIACETATE (VIII)

Following the procedure of Example 5, but substituting 6α,9α-difluoro-11β,16α,17α,21-tetrahydroxy-1,4-pregnadiene-3,20-dione 21-acetate (XIII) as starting material, yields light-colored, crystalline 6α,9α-difluoro-11α,16α,17α,21-tetrahydroxy-1,4-pregnadiene-3,20-dione 16,21-diacetate (VIII).

*Example 14*

6α,9α-DIFLUORO-11β,16α,17α,21-TETRAHYDROXY-1,4-PREGNADIENE-3,20-DIONE (IX)

To a solution of 3 g. of 6α,9α-difluoro-11β,16α,17α,21-tetrahydroxy-1,4-pregnadiene-3,20-dione 21-acetate (XIII) in 60 ml. of methanol, previously purged of air and oxygen by passing nitrogen therethrough for about 10 minutes, there is added a solution of 1.5 g. of potassium bicarbonate in 10 ml. of water, similarly purged of oxygen. The thus-obtained mixture is allowed to stand at room temperature until hydrolysis is complete. The reaction mixture is then neutralized with acetic acid in water and concentrated to approximately ⅓ of its volume under reduced pressure on a warm water bath. Water is then added and the mixture chilled. The crystalline product obtained following chilling is collected on a filter, washed with water and dried to give pure, light-colored crystalline 6α,9α-difluoro-11β,16α,17α,21-tetrahydroxy-1,4-pregnadiene-3,20-dione (IX).

*Example 15*

1-SATURATED DERIVATIVES OF THE COMPOUNDS REPRESENTED BY FORMULAE II TO XVI OF THE FLOW-SHEET

Following the procedures of Examples 1 to 14, but substituting the corresponding Δ$^4$-compounds for the Δ$^{1,4}$-starting materials disclosed therein, yields the 1-saturated counterparts of the steroids prepared in the aforesaid examples. In this manner the following compounds are produced: 6α-fluoro-17α,21-dihydroxy-4,9(11)-pregnadiene-3,20-dione 21-acetate (II), 6α-fluoro-21-hydroxy-4,9(11),16-pregnatriene-3,20-dione 21-acetate (III), 6α-fluoro-16α,17α,21-trihydroxy-4,9(11)-pregnadiene-3,20-dione 21-acetate (IV), 6α-fluoro-16α,17α-21-trihydroxy-4,9(11)-pregnadiene-3,20-dione 16,21-diacetate (V), 6α-fluoro-9α-bromo-11β,16α,17α,21-tetrahydroxy-4-pregnene-3,20-dione 16,21-diacetate (VI), 6α-fluoro-9β,11β-epoxy-16α,17α,21-trihydroxy-4-pregnene 3,20-dione 16,21-diacetate (VII), 6α,9α-difluoro-11β,16α,17α,21-tetrahydroxy-4-pregnene-3,20-dione 16,21-diacetate (VIII), 6α,9α-difluoro-11β,16α,17α,21-tetrahydroxy-4-pregnene-3,20-dione (IX), 6α-fluoro-9α-bromo-11β,21-dihydroxy-4,16-pregnadiene-3,20-dione 21-acetate (X), 6α,9α-difluoro-11β,21-dihydroxy-4,16-pregnadiene-3,20-dione 21-acetate (XII), 6α,9α-difluoro-11β,16α,17α,21-tetrahydroxy-4-pregnene-3,20-dione 21-acetate (XIII), 6α-fluoro-17β-methyl-21-acetoxy-4,9(11), 13(14)-17α,18-nor-pregnatriene-3,20-dione (XIV), 6α,9α-difluoro-21-hydroxy-4,16-pregnadiene-3,11,20-trione 21-acetate (XV) and 6α,9α-difluoro-16α,17α,21-trihydroxy-4-pregnene-3,11,20-trione (XVI).

The compounds of the foregoing examples wherein there is an acetyl radical at the 21-position can be hydrolyzed to yield the corresponding 21-hydroxy steroids by the following procedure of Example 14. The compounds of the foregoing examples wherein there are acetyl radicals at the 16- and 21-positions can be hydrolyzed to give the corresponding 16,21-dihydroxy steroids by following the procedure of Example 8.

While the compounds prepared in Examples 1 to 15 are 21-acetates and 16,21-diacetates, other 21-acylates and 16,21-diacylates can be prepared in a similar manner by substituting as starting material a corresponding 21-acylate and 16,21-diacylate other than the 21-acetate and 16,21-diacetate, wherein the acyl radical is, for example, a lower-aliphatic acid, e.g., propionic, butyric, isobutyric, valeric, isovaleric, 2-methylbutyric, 3-ethylbutyric, hexanoic, diethylacetic, decanoic, hetanoic, octanoic, undecanoic, a cyclic acid, e.g., cyclopropylideneacetic, a cycloaliphatic, e.g., cyclopentylformic, cyclopentylacetic, β-cyclopentylpropionic, cyclohexylformic, cyclohexylacetic, β-cyclohexylpropionic, an aryl or aralkyl acid, e.g., benzoic, methylbenzoic, dimethylbenzoic, ethylbenzoic, trimethylbenzoic, an aralkyl acid, e.g., phenylacetic, phenylpropionic, and p-hexyloxyphenylpropionic acid.

We claim:

1. Compounds of the formula

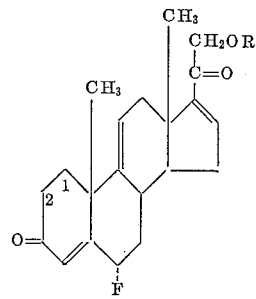

wherein the 1,2-carbon linkage is selected from the group consisting of single bonds and double bonds and R is selected from the group consisting of hydrogen and the acyl radical of a hydrocarbon carboxylic acid containing from one to twelve carbon atoms, inclusive.

2. 6α-fluoro-21-hydroxy-1,4,9(11),16-pregnatetraene-3,20-dione 21-acetate.

3. Compounds of the formula

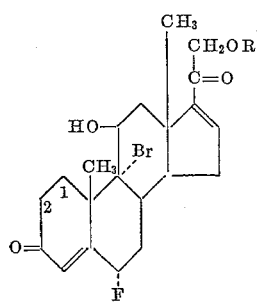

wherein the 1,2-carbon linkage is selected from the group consisting of single bonds and double bonds and R is selected from the group consisting of hydrogen and the acyl radical of a hydrocarbon carboxylic acid containing from one to twelve carbon atoms, inclusive.

4. Compounds of the formula

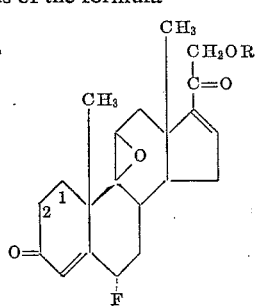

wherein the 1,2-carbon linkage is selected from the group consisting of single bonds and double bonds and R is selected from the group consisting of hydrogen and the acyl radical of a hydrocarbon carboxylic acid containing from one to twelve carbon atoms, inclusive.

5. Compounds of the formula

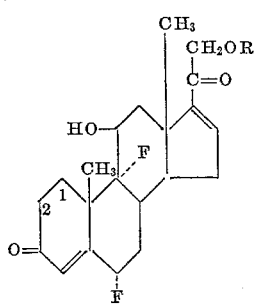

wherein the 1,2-carbon linkage is selected from the group consisting of single bonds and double bonds and R is selected from the group consisting of hydrogen and the acyl radical of a hydrocarbon carboxylic acid containing from one to twelve carbon atoms, inclusive.

6. A process for the production of a compound of the Formula III

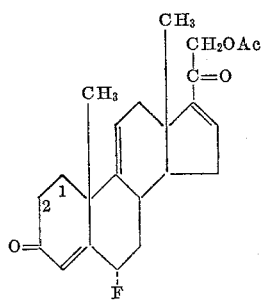

wherein the 1,2-carbon linkage is selected from the group consisting of single bonds and double bonds and Ac is the acyl radical of an organic carboxylic acid containing from one to twelve carbon atoms, inclusive, which comprises reacting under anhydrous conditions in a basic organic medium with (1) about 2 moles of a compound selected from the group consisting of N-haloamides and N-haloimides and (2) about 2 moles of anhydrous sulfur dioxide, about 1 mole of a corresponding compound of the Formula I

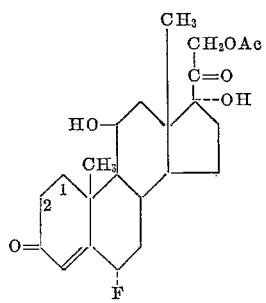

wherein 1,2 and Ac have the same meanings as above.

7. A process for the production of a compound of the Formula III

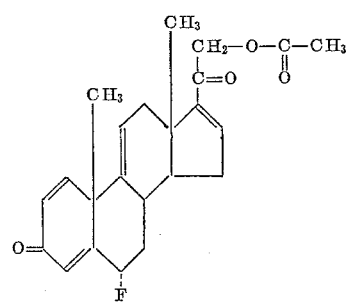

which comprises reacting under anhydrous conditions in a basic organic medium with (1) about 2 moles of a compound selected from the group consisting of N-haloamides and N-haloimides and (2) about 2 moles of anhydrous sulfur dioxide, about 1 mole of the compound of the Formula I

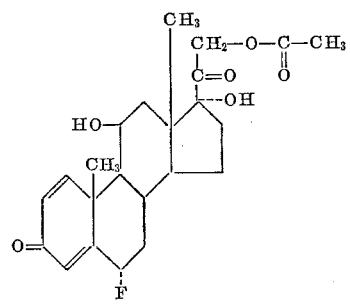

8. A process for the production of a compound of the Formula III

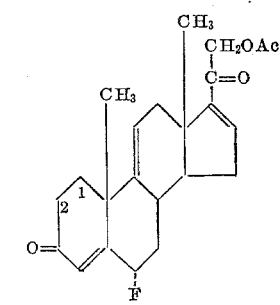

wherein the 1,2-carbon linkage is selected from the group consisting of single bonds and double bonds and Ac is the acyl radical of an organic carboxylic acid containing from one to twelve carbon atoms, inclusive, which comprises reacting under anhydrous conditions in a basic medium with (1) about 1 mole of a compound selected from the group consisting of N-haloamides and N-haloimides and (2) about 1 mole of anhydrous sulfur dioxide, about 1 mole of a corresponding compound of the Formula II

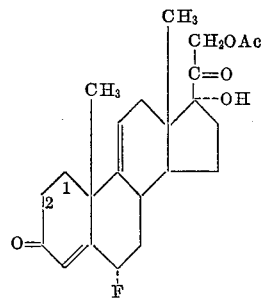

(II)

wherein 1,2 and Ac have the same meanings as above.

9. A process for the production of the compound of the Formula III

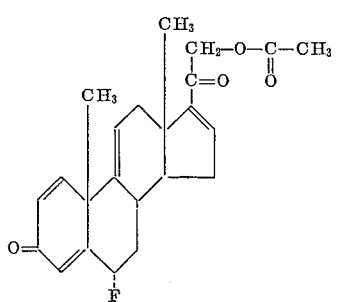

(III)

which comprises reacting under anhydrous conditions in a basic medium with (1) about 1 mole of a compound selected from the group consisting of N-haloamides and N-haloimides and (2) about 1 mole of anhydrous sulfur dioxide, about 1 mole of the compound of the Formula II

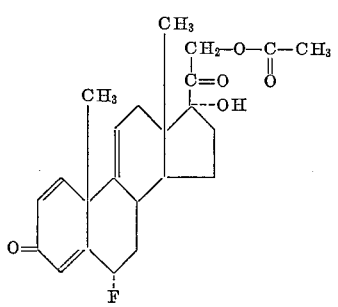

(II)

10. A process for the production of a compound of the Formula III

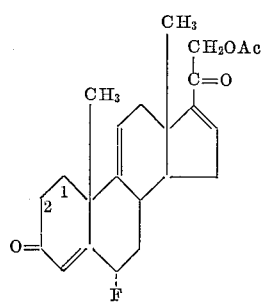

(III)

wherein the 1,2-carbon linkage is selected from the group consisting of single bonds and double bonds and Ac is the acyl radical of an organic carboxylic acid containing from one to twelve carbon atoms, inclusive, which comprises (a) reacting under anhydrous conditions in a basic organic medium with (1) about 1 mole of a compound selected from the group consisting of N-haloamides and N-haloimides and (2) about 1 mole of anhydrous sulfur dioxide, about 1 mole of a compound of the Formula I

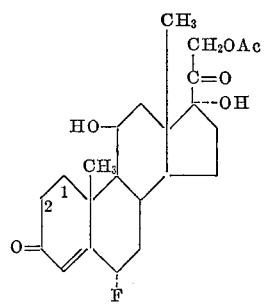

(I)

wherein 1,2 and Ac have the same meanings as above, to produce a compound of the Formula II

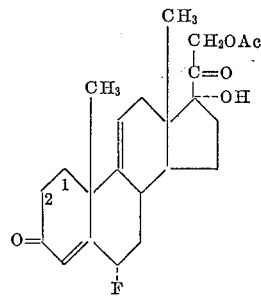

(II)

wherein 1,2 and Ac have the same meanings as above, and (b) reacting under anhydrous conditions in a basic medium with (1) about 1 mole of a compound selected from the group consisting of N-haloamides and N-haloimides and (2) about 1 mole of anhydrous sulfur dioxide, about 1 mole of a compound of Formula II to yield a compound of Formula III, above.

11. A process for the production of the compound of the Formula III

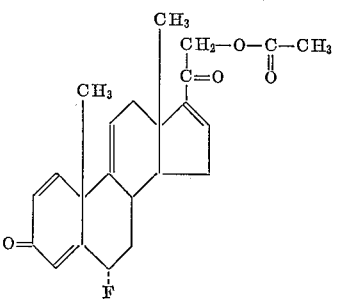

(III)

which comprises (a) reacting under anhydrous conditions in a basic organic medium with (1) about 1 mole of a compound selected from the group consisting of N-haloamides and N-haloimides and (2) about 1 mole of anhydrous sulfur dioxide, about 1 mole of the compound of the Formula I

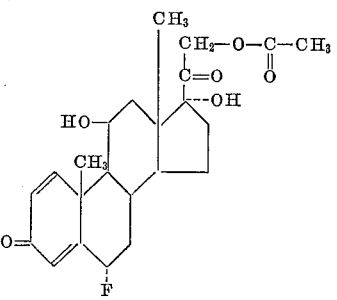

(I)

to produce the compound of the Formula II

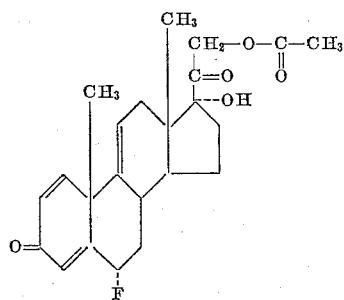
(II)

and (b) reacting under anhydrous conditions in a basic medium with (1) about 1 mole of a compound selected from the group consisting of N-haloamides and N-haloimides and (2) about 1 mole of anhydrous sulfur dioxide, about 1 mole of the compound of Formula II to yield the compound of Formula III, above.

References Cited by the Examiner
UNITED STATES PATENTS

| | | | |
|---|---|---|---|
| 2,837,464 | 6/58 | Nobile | 195—51 |
| 2,951,840 | 9/60 | Ringold et al. | 260—239.55 |
| 2,985,652 | 5/61 | Ringold et al. | 260—239.55 |
| 2,997,489 | 8/61 | Ringold et al. | 260—397.45 |
| 3,014,938 | 12/61 | Mills et al. | 260—397.47 |
| 3,107,240 | 10/63 | Ringold et al. | 260—239.55 |
| 3,137,712 | 6/64 | Berkenmeyer et al. | 260—397.45 |

LEWIS GOTTS, *Primary Examiner.*

UNITED STATES PATENT OFFICE
CERTIFICATE OF CORRECTION

Patent No. 3,210,341                                    October 5, 1965

Frank H. Lincoln et al.

It is hereby certified that error appears in the above numbered patent requiring correction and that the said Letters Patent should read as corrected below.

Columns 1 and 2, formula (IV) should appear as shown below instead of as in the patent:

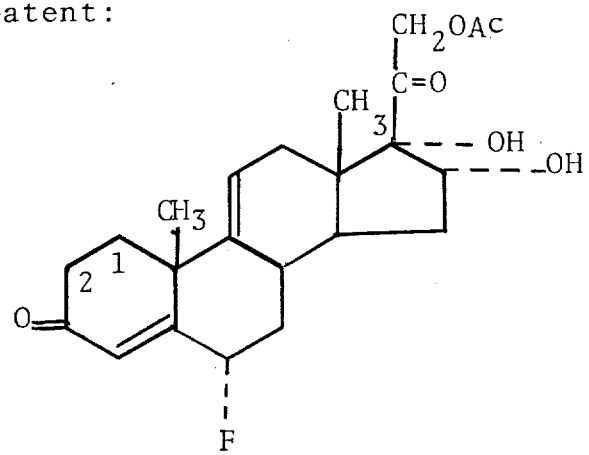

column 6, line 38, for "-dihydroxy 1,4,16-" read -- -dihydroxy-1,4,16- --; line 60, for "-hydroxyl-" read -- -hydroxy- --; column 7, line 56, for "N-bromoactamide" read -- N-bromoacetamide --; column 8, line 21, for "-hydroxyl-" read -- -hydroxy- --; column 11, line 48, for "225" read -- 255 --; column 14, line 20, for "-4,9(11), 13(14)-" read -- -4,9(11),13(14)- --; line 27, for "the following" read -- following the --; same column 14, line 41, for "hetanoic" read -- heptanoic --.

Signed and sealed this 10th day of January 1967.

(SEAL)
Attest:

ERNEST W. SWIDER                                EDWARD J. BRENNER
Attesting Officer                               Commissioner of Patents